United States Patent
Kim et al.

(10) Patent No.: US 10,703,573 B2
(45) Date of Patent: Jul. 7, 2020

(54) FRICTION-TYPE DRIVE APPARATUS AND CAROUSEL COMPRISING SAME

(71) Applicants: KOREA AIRPORTS CORPORATION, Gangseo-gu, Seoul (KR); YEO MYUNG HI-TECH, CO., LTD, Siheung-si, Gyeonggi-do (KR)

(72) Inventors: Dong Soo Kim, Gimpo-si (KR); Myung Hee Lee, Siheung-si (KR)

(73) Assignees: KOREA AIRPORTS CORPORATION, Gangseo-gu, Seoul (KR); YEO MYUNG HI-TEC, CO., LTD, Siheung-si, Gyeonggi-do (KR)

( * ) Notice: Subject to any disclaimer, the term of this patent is extended or adjusted under 35 U.S.C. 154(b) by 24 days.

(21) Appl. No.: 16/081,517

(22) PCT Filed: Jul. 19, 2017

(86) PCT No.: PCT/KR2017/007771
§ 371 (c)(1),
(2) Date: Aug. 31, 2018

(87) PCT Pub. No.: WO2018/016874
PCT Pub. Date: Jan. 25, 2018

(65) Prior Publication Data
US 2020/0017306 A1  Jan. 16, 2020

(30) Foreign Application Priority Data
Jul. 19, 2016  (KR) .......... 10-2016-0091404

(51) Int. Cl.
*B65G 23/02*  (2006.01)
*B64F 1/36*  (2017.01)
(Continued)

(52) U.S. Cl.
CPC .............. *B65G 23/02* (2013.01); *B64F 1/368* (2013.01); *B65G 17/38* (2013.01); *B65G 23/14* (2013.01);
(Continued)

(58) Field of Classification Search
CPC ............ B65G 23/14; B65G 2201/0264; B65G 17/065; B65G 17/066; B65G 23/02; B65G 17/38; B65G 43/00; B64F 1/368
See application file for complete search history.

(56) References Cited

U.S. PATENT DOCUMENTS 3,554,360 A * 1/1971 Bildsoe ................ B65G 17/066
198/833
5,418,600 A   5/1995 Genovese
(Continued)

FOREIGN PATENT DOCUMENTS

DE  102011003227 A1  8/2012
JP  H05-039077  7/1993
(Continued)

OTHER PUBLICATIONS

International Search Report of PCT/KR2017/007771 dated Sep. 26, 2017.
(Continued)

*Primary Examiner* — Mark A Deuble
(74) *Attorney, Agent, or Firm* — Eversheds Sutherland (US) LLP

(57) ABSTRACT

A friction-type drive apparatus and a carousel comprising the same are disclosed. A friction-type drive apparatus, according to one embodiment, comprises: a motor; a drive pulley rotated by the motor; a belt connected to the drive pulley; a driven pulley rotating in accordance with the drive of the belt; a pressing unit contacting the inner surface of the belt; and an elastic unit for pressing the pressing unit toward the belt.

9 Claims, 9 Drawing Sheets

(51) Int. Cl.
  *B65G 17/38* (2006.01)
  *B65G 43/00* (2006.01)
  *F16H 7/02* (2006.01)
  *F16H 7/20* (2006.01)
  *B65G 23/14* (2006.01)

(52) U.S. Cl.
  CPC ............ *B65G 43/00* (2013.01); *F16H 7/023* (2013.01); *F16H 7/20* (2013.01)

(56) References Cited

U.S. PATENT DOCUMENTS

| | | | |
|---|---|---|---|
| 7,588,140 B2* | 9/2009 | van den Goor | B65G 17/066 198/831 |
| 8,312,988 B2* | 11/2012 | Wilson | B65G 17/066 198/832 |
| 10,017,361 B2* | 7/2018 | Wagenleitner | B65G 23/14 |
| 2008/0296130 A1* | 12/2008 | Langsdorf | B65G 17/066 198/794 |

FOREIGN PATENT DOCUMENTS

| | | |
|---|---|---|
| JP | 2008-196696 A | 8/2008 |
| JP | 5898100 B2 | 4/2016 |
| KR | 20-2000-0013536 U | 7/2000 |
| KR | 20-0208275 Y1 | 12/2000 |
| KR | 20-0263593 Y1 | 2/2002 |
| KR | 20030022171 A | 3/2003 |
| KR | 10-0504444 B1 | 7/2005 |
| KR | 10-0964070 B1 | 6/2010 |
| KR | 10-1206444 B1 | 11/2012 |
| KR | 101206444 B1 | 11/2012 |
| KR | 10-1487240 B1 | 1/2015 |
| KR | 10-2015-0186521 A | 12/2015 |
| KR | 10-1587229 B1 | 1/2016 |
| WO | 2015004033 A1 | 1/2015 |

OTHER PUBLICATIONS

Written Opinion of PCT/KR2017/007771 dated Sep. 26, 2017.
Supplementary European Search Report dated Feb. 26, 2020 for Corresponding European Application No. 17831347.4.

* cited by examiner

FIG. 4
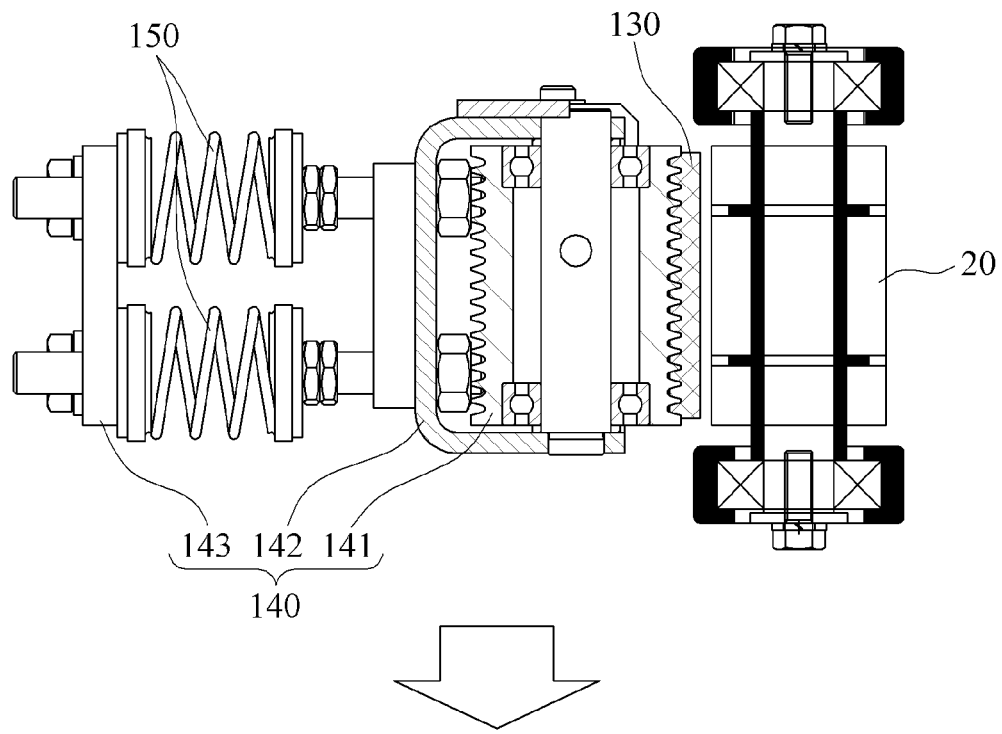
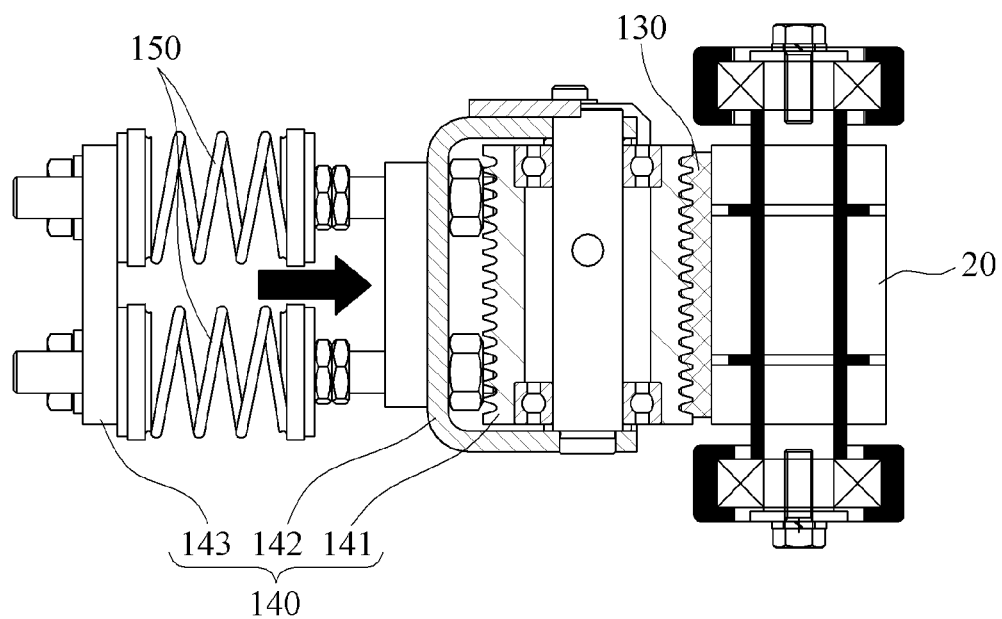

FRICTION-TYPE DRIVE APPARATUS AND CAROUSEL COMPRISING SAME

TECHNICAL FIELD

Example embodiments relate to a frictional drive apparatus and a carousel including the frictional drive apparatus.

BACKGROUND ART

An airport is generally equipped with a conveyor system or facility to transport baggage. The conveyor system includes a closed-loop type rotatable conveyor, or a carousel, that is installed at a last portion of the conveyor system and configured to rotate in a certain space to classify baggage by destination or receive baggage.

The baggage carried onto the carousel is carried by a plurality of slat plates of the carousel. Each of the slate plates is connected to a main chain, and moves along a surface of the carousel in accordance with a movement of the main chain in response to an operation of a drive apparatus.

An existing drive apparatus for a carousel may rotate on a sprocket wheel attached to a decelerator shaft by a rotational force generated by a motor and a decelerator, and transmit this rotational force to a caterpillar chain to rotate the main chain.

However, such a drive method applied to the existing drive apparatus may generate an excessive amount of noise because the sprocket wheel and the caterpillar chain are engaged.

In addition, when a filature or fault occurs in the drive apparatus, there needs a great amount of time to connect an auxiliary drive apparatus and the carousel, which may cause many airport users to make complaints.

Therefore, there is a desire for a drive apparatus for a carousel that does not generate a great amount of noise and is replaced immediately.

For example, Korean Application No. 10-2015-0186521 discloses a carousel with a round bar-type rail that allows slats to move flexibly. The carousel may have the rail that is provided in a round bar-type and may thus reduce noise generated when the carousel operates.

DISCLOSURE

Technical Goals

An aspect provides a frictional drive apparatus that operates by a friction between a belt and a pressing unit.

Another aspect also provides a frictional drive apparatus including an elastic unit configured to press the pressing unit towards a belt to closely connect the belt and a block chain.

Still another aspect also provides a carousel configured to readily control an operation of a drive apparatus, through a reverse rotation preventer provided in a driving pulley of the drive apparatus.

Yet another aspect also provides a carousel including a plurality of drive apparatuses. The carousel may include a controller configured to immediately operate or activate an auxiliary drive apparatus when some of the drive apparatuses fail.

Technical Solutions

According to an example embodiment, there is provided a frictional drive apparatus including a motor, a driving pulley configured to rotate by the motor, a belt connected to the driving pulley, a driven pulley configured to rotate by an operation of the belt, a pressing unit in contact with an inner surface of the belt, and an elastic unit configured to press the pressing unit towards the belt.

At least a portion of an outer surface of the belt may be brought into contact with a block chain configured to move slat plates of a carousel, and the elastic unit may press the pressing unit towards the block chain to closely connect the belt and the block chain.

The pressing unit may include a pressing frame, a pressing portion in contact with the inner surface of the belt, and a pressing connector of which one side is connected to the pressing portion and another side is connected to the pressing frame to adjust a relative distance from the belt.

The elastic unit of which one side is connected to the pressing frame and another side is connected to the pressing connector may adjust a distance between the pressing frame and the pressing connector and press the pressing connector towards the belt.

The pressing portion may include a plurality of rotatable pressing rollers.

The pressing rollers may be disposed along a longitudinal direction of the belt.

The belt may include a belt groove formed on the inner surface of the belt in the longitudinal direction of the belt.

Each of the pressing rollers may include a roller groove corresponding to the belt groove, and the belt groove and the roller groove may be brought into contact with each other to be engaged with each other.

The frictional drive apparatus may further include a reverse rotation preventer provided on a drive shaft of the driving pulley and configured to prevent a reverse rotation of the driving pulley.

According to another example embodiment, there is provided a carousel including a plurality of drive apparatuses, a block chain connected to the drive apparatuses and to move, and a plurality of slat plates successively disposed to move in accordance with the movement of the block chain. Each of the drive apparatuses may include a driving pulley configured to rotate by receiving power from a motor, a belt connected to the driving pulley, a driven pulley configured to rotate in accordance with a movement of the belt, a pressing unit in contact with an inner surface of the belt, an elastic unit configured to press the pressing unit towards the belt, and a reverse rotation preventer provided on a drive shaft of the driving pulley and configured to prevent a reverse rotation of the driving pulley.

The carousel may further include a controller configured to control operations of the drive apparatuses. The controller may control a portion of the drive apparatuses to operate.

When operations of the portion of the drive apparatuses in operation are suspended, the controller may control another portion of the drive apparatuses not in operation to operate.

Advantageous Effects

According to example embodiments described herein, a frictional drive apparatus may closely connect a belt thereof and a main block chain of a carousel through a pressing unit thereof.

According to example embodiments described herein, a frictional drive apparatus may maintain a consistent frictional force between a belt thereof and a main chain of a carousel, through an elastic unit configured to press a pressing unit towards the belt.

According to example embodiments described herein, a frictional drive apparatus may prevent a belt from being detached from a pressing unit through a groove formed respectively corresponding to the belt and the pressing unit.

According to example embodiments described herein, a frictional drive apparatus may rapidly respond to a failure or a fault occurring in the frictional drive apparatus through a reverse rotation preventer provided in a driving pulley.

According to example embodiments described herein, a carousel may rapidly operate or activate an auxiliary drive apparatus through a controller when some of frictional drive apparatuses fails.

The effects of the frictional drive apparatus and the carousel including the frictional drive apparatus are not limited to the example effects described in the foregoing. Other effects that are not described above may be understood by those ordinary skill in the art from the following description.

BRIEF DESCRIPTION OF DRAWINGS

These and/or other aspects, features, and advantages of the present disclosure will become apparent and more readily appreciated from the following description of example embodiments, taken in conjunction with the accompanying drawings of which:

FIG. 4 is a diagram illustrating an example of how an elastic unit of a frictional drive apparatus presses a pressing unit of the frictional drive apparatus according to an example embodiment;

BEST MODE FOR CARRYING OUT THE INVENTION

Figure 1:
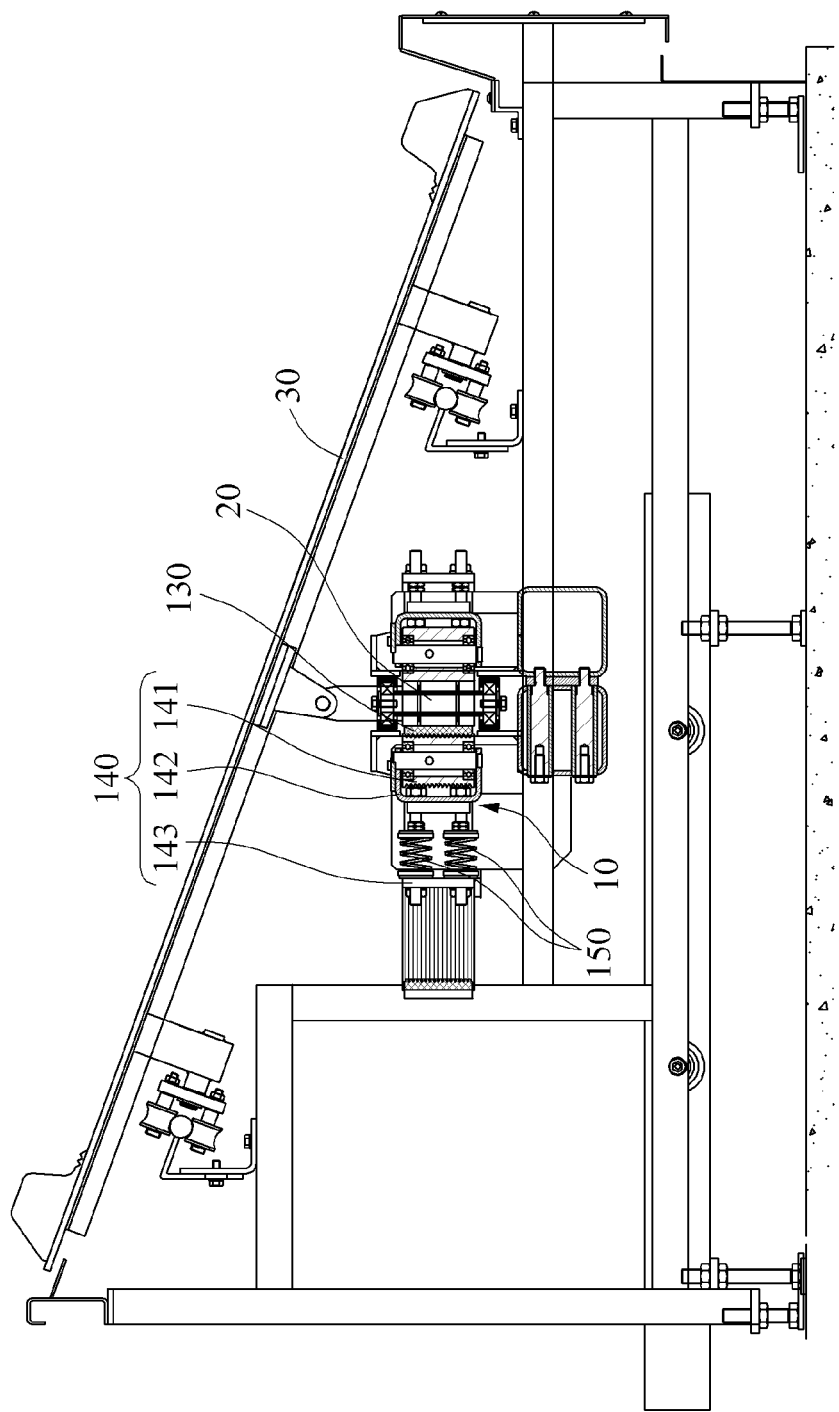
FIG. 1 is a front view of a frictional drive apparatus as viewed in a movement direction of a carousel according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The terminology used herein is for the purpose of describing particular embodiments only and is not intended to be limiting. As used herein, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

In addition, element(s) or component(s) included in one example embodiment may be referred to as the same as element(s) or component(s) included in other example embodiments if they have the same or common functions or functionalities. Unless otherwise noted, the description of one example embodiment may be applied to another example embodiment, and a detailed description thereof may thus be omitted when it is repeated.

Hereinafter, a frictional drive apparatus 10 according to an example embodiment will be described with reference to FIGS. 1 through 6.

Figure 2:
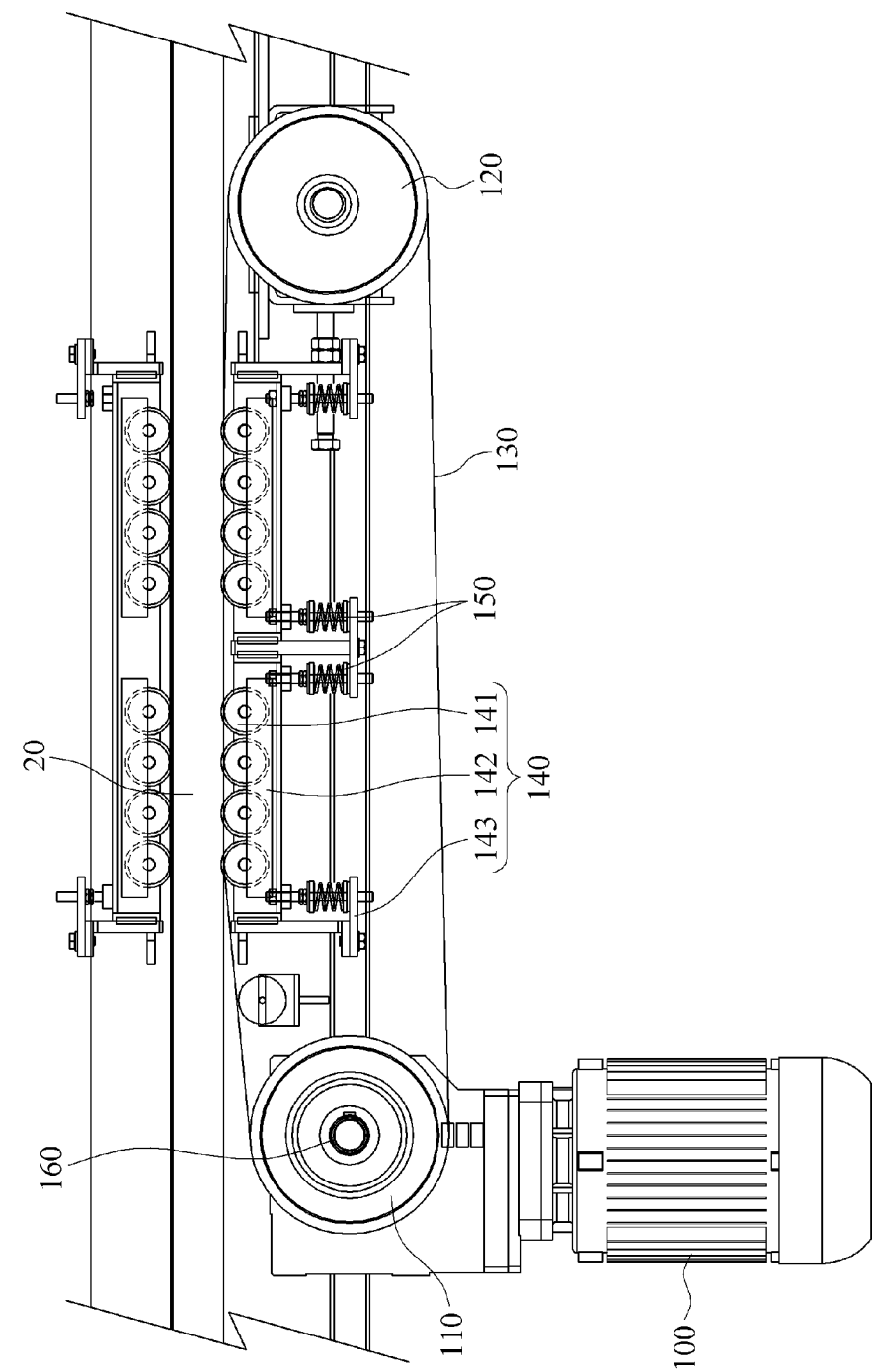
FIG. 2 is a top view of a frictional drive apparatus as viewed from above according to an example embodiment.
Figure 3:
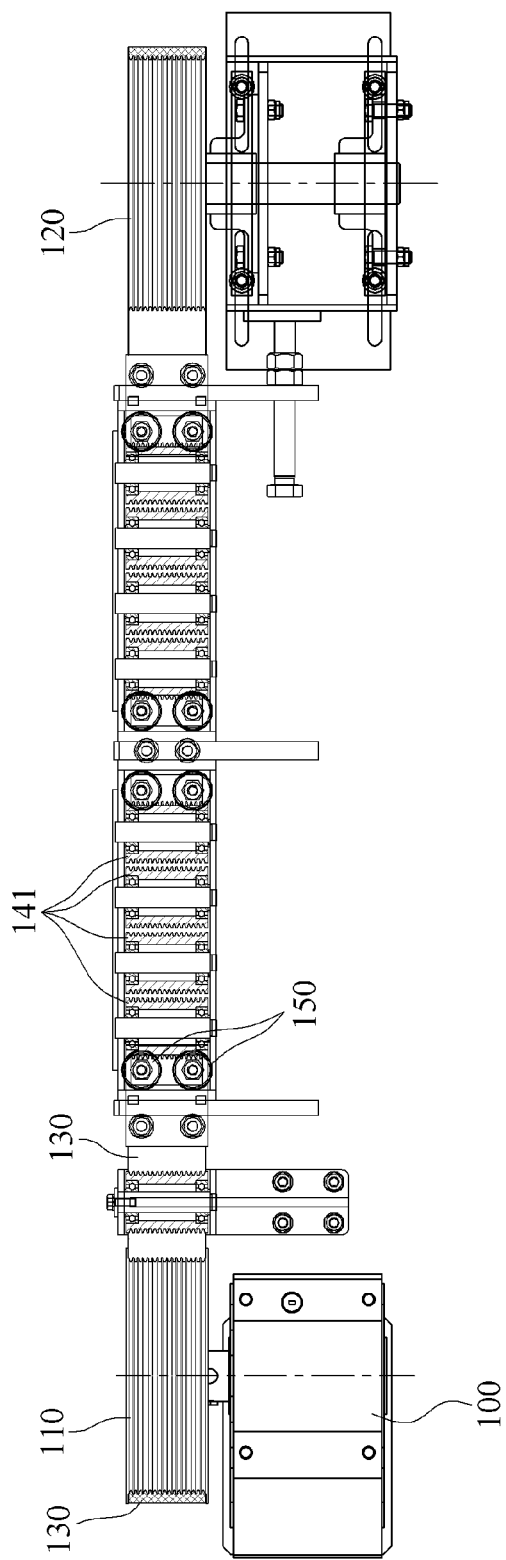
FIG. 3 is a side view of a frictional drive apparatus as viewed from side according to an example embodiment.
Figure 5:
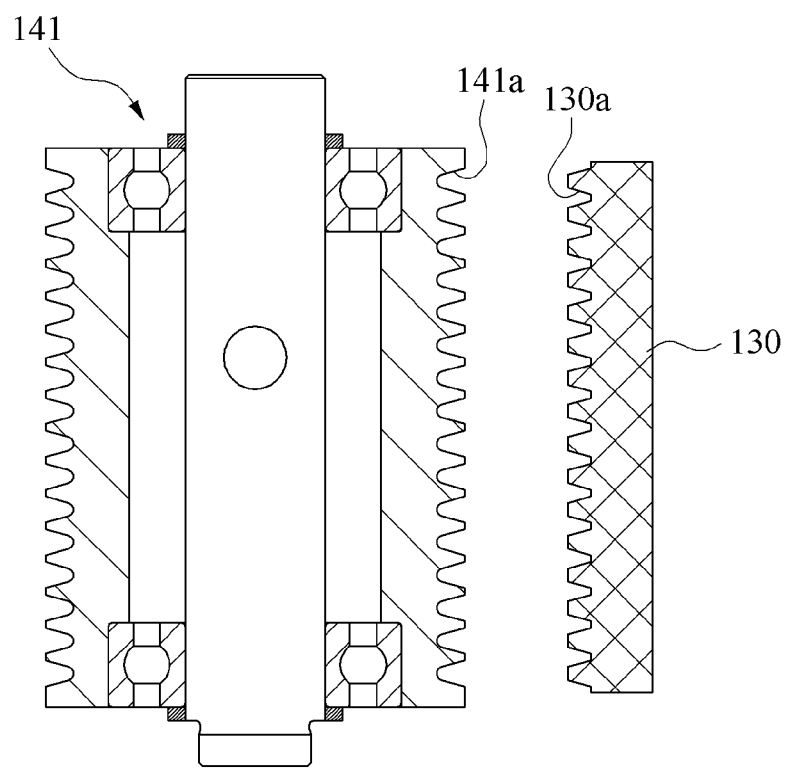
FIG. 5 is a diagram illustrating an example of how a roller groove and a belt groove formed in a pressing roller and a belt, respectively, of a frictional drive apparatus are engaged with each other according to an example embodiment.
Figure 6:
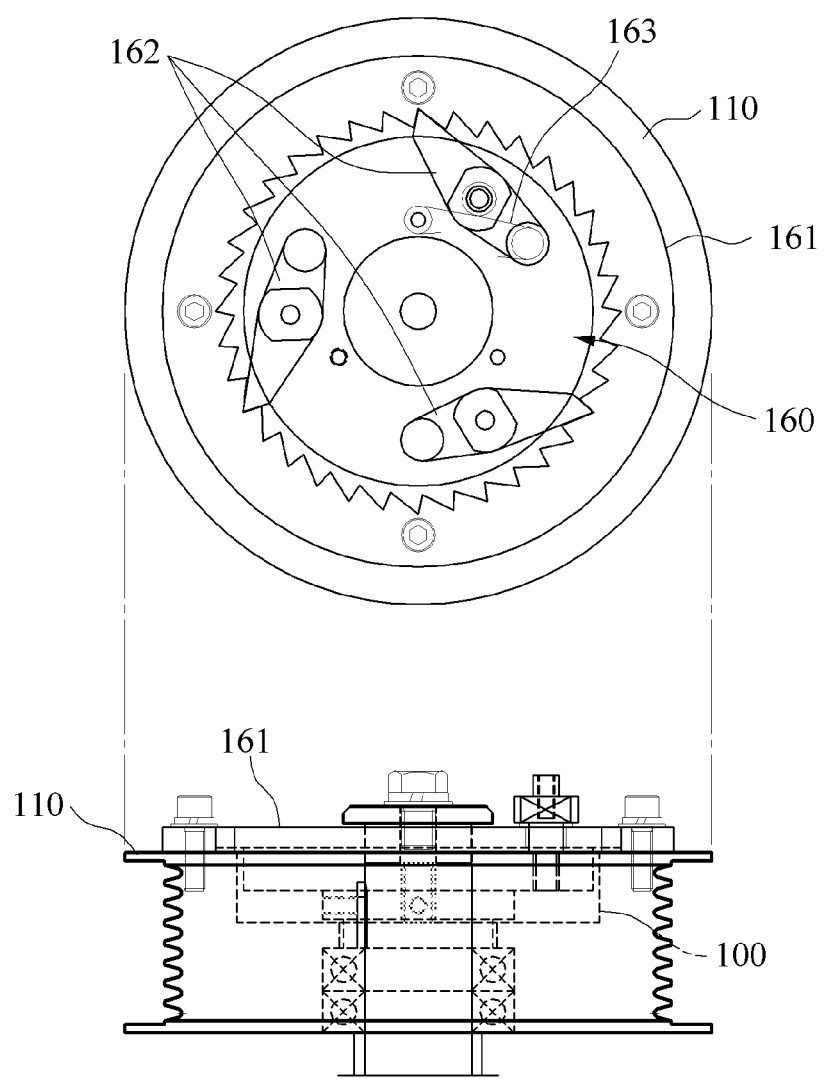
FIG. 6 is a diagram illustrating a reverse rotation preventer of a frictional drive apparatus that is connected to a driving pulley of the frictional drive apparatus according to an example embodiment.

FIG. 1 is a front view of the frictional drive apparatus 10 provided in a carousel 1 as viewed in a movement direction of slat plates 30. FIG. 2 is a top view of the frictional drive apparatus 10 as viewed from above. FIG. 3 is a side view of the frictional drive apparatus 10 as viewed from side. FIG. 4 is a diagram illustrating an example of how an elastic unit 150 of the frictional drive apparatus 10 presses a pressing unit 140 thereof. FIG. 5 is a diagram illustrating an example of how a roller groove 141a and a belt groove 130a formed in a pressing roller 141 and a belt 130, respectively, are engaged with each other. FIG. 6 is a diagram illustrating an example of how a reverse rotation preventer 160 acts on a driving pulley 110.

According to an example embodiment, the frictional drive apparatus 10 may be connected to a conveyor belt system to provide power. The frictional drive apparatus 10 may be in contact with a conveyor belt to be connected to the conveyor belt system, and allow the conveyor belt to operate by a frictional force generated by such a contact therebetween.

For example, the frictional drive apparatus 10 may be used as a power source for the carousel 1. The carousel 1 may not be only used for transportation and reception of baggage at airports, but also used for transportation and reception of various products and goods in factories or processes.

The term "baggage" used herein may indicate various goods or products that require transportation and reception processes, in addition to a lexical meaning of baggage as defined in a dictionary.

Hereinafter, the carousel 1 that is used at an airport is provided as an example to which the frictional drive apparatus 100 supplies power. This is because, it is not possible to describe all devices or apparatuses to which the frictional drive apparatus 10 may be connected, and thus the example is used herein for convenience of description. However, what the frictional drive apparatus 10 may be connected to is not limited to the carousel 1.

As illustrated, the carousel 1 includes the plurality of slat plates 30 that is successively provided on a surface of the carousel 1. The slat plates 30 are connected to a block chain 20 inside the carousel 1. The slat plates 30 may thus move in accordance with a movement of the block chain 20.

The block chain 20 may be formed in a closed loop based on a form of the carousel 1. When connected to the frictional drive apparatus 10, the block chain 20 may receive power therefrom to move in a direction along the closed loop of the carousel 1.

Herein, the block chain 20 and the frictional drive apparatus 10 may be connected by being in contact with each other, and the block chain 20 may move by a frictional force that is generated by a contact between the block chain 20 and the belt 130 as described hereinafter. The block chain 20 may be formed as a long chain by a plurality of blocks being successively connected as described hereinafter.

A surface of the block chain 20, which is a surface in contact with the frictional drive apparatus 10, may be formed to generate a sufficient frictional force. For example, this surface may be formed to be flat to have a wide contact area, and also be formed to correspond to a surface of the belt 130 that is to be in contact therewith.

The frictional drive apparatus 10 includes a motor 100, the driving pulley 110 configured to rotate by receiving power from the motor 100, the belt 130 connected to the driving pulley 110 to receive power, a driven pulley 120 configured to rotate by an operation of the belt 130, the pressing unit 140 in contact with an inner surface of the belt 130, and the elastic unit 150 configured to press the pressing unit 140 towards the belt 130.

The motor 100 generates rotational power by receiving electric power, and transfers the rotational power to the driving pulley 110. Herein, various types of motor may be used as the motor 100 based on an environment or purpose of use.

For example, a geared motor may be used as the motor 100 to change a rotation direction of the driving pulley 110 and the driven pulley 120 connected to the driving pulley 110 through the belt 130, and power generated by an operation of the motor 100 may be transferred to the driving pulley 100.

The driving pulley 110 may receive power from the motor 100 to rotate. The driving pulley 110 may be connected to the motor 100 through a drive shaft of the driving pulley 110, and the driving pulley 110 may thus rotate in accordance with a rotation of the motor 100.

A rotation direction of the driving pulley 110 may correspond to a rotation direction of the motor 100. For example, when the motor 100 rotates, the drive shaft connected to the driving pulley 110 rotates clockwise in FIG. 2 and the driving pulley 110 also rotates clockwise correspondingly.

In contrast, when the motor 100 rotates counterclockwise in FIG. 2, the driving pulley 110 also rotates counterclockwise correspondingly.

The drive shaft of the driving pulley 110 is provided with the reverse rotation preventer 160. The reverse rotation preventer 160 may prevent the driving pulley 110 from rotating in a reverse direction that is opposite to a set direction. For example, the rotation direction of the driving pulley 110 may be set based on a direction in which the slat plates 30 of the carousel 1 move, and the reverse rotation preventer 160 may prevent the driving pulley 110 from rotating in a direction opposite to such a movement direction.

For example, as illustrated in FIG. 6, the driving pulley 110 is connected to a brackets 161 in which saw teeth are formed. The drive shaft connected to the motor 100 is connected to a ratchet 162 provided in a shape corresponding to that of the saw teeth in the bracket 161.

A plurality of ratchets may be provided as the ratchet 162, and connected to be engaged with the saw teeth of the bracket 161. When the drive shaft of the motor 100 rotates, the ratchet 162 may transfer power to the bracket 161 to rotate the driving pulley 110.

The ratchet 162 includes a torsion spring 163 configured to allow the ratchet 162 that has rotated in a direction to return to its original position.

That is, the ratchet 162 may rotate in a direction while transferring power to a single saw tooth of the bracket 161, and the torsion spring 163 may allow the ratchet 162 to return to the original position through an elastic force of the torsion spring 163. The ratchet 162 may thus transfer power to another saw tooth of the bracket 161.

In addition, the driving pulley 110 may rotate only in the set direction based on an arrangement of the ratchet 162 and the saw teeth of the ratchet 161. Although it is illustrated in FIG. 6 that the driving pulley 110 rotates counterclockwise, the driving pulley 110 may also rotate clockwise only based on an arrangement of the bracket 161 and the ratchet 162.

In addition, even when the motor 100 does not rotate, the reverse rotation preventer 160 may allow the driving pulley 110 to rotate in a direction by such a configuration of the ratchet 162.

For example, even when the motor 100 does not rotate and power is not transferred to the driving pulley 110, the belt 130 may receive a frictional force by a movement of the block chain 20 when the carousel 1 moves. The driving pulley 110 may then rotate without load, or perform no-load rotation, and the belt 130 may thus rotate normally.

That is, the reverse rotation preventer 160 may allow the driving pulley 110 to rotate when the frictional drive apparatus 10 receives power and the motor 100 operates, and allow the driving pulley 110 to perform the no-load rotation when the motor 100 does not operate.

For example, in a case in which one of a plurality of frictional drive apparatuses connected to the carousel 1 fails, the driving pulley 110 may perform the no-load rotation, and it is possible to operate an auxiliary frictional drive apparatus 10 without an additional disassembling and assembling process. Thus, the carousel 1 may normally operate without being suspended.

The belt 130 is connected along an outer surface of the driving pulley 110, and may thus rotate by receiving power based on the rotation of the driving pulley 110. In addition, the belt 130 may rotate in a direction corresponding to the rotation direction of the driving pulley 110.

The belt 130 is also connected to the driven pulley 120, and may thus transfer power received from the driving pulley 110 to the driven pulley 120. Herein, the belt 130 may be connected to the driven pulley 120 as the belt 130 surrounds an outer surface of the driven pulley 120.

Hereinafter, a surface on which the belt 130 is in contact with the driving pulley 110 and the driven pulley 120 is defined as an inner surface, and an opposite surface thereof is defined as an outer surface.

The outer surface of the belt 130 is brought into contact with another device, and may thus provide power of the frictional drive apparatus 10 to the other device. In such a case, the power of the frictional drive apparatus 10 may be transferred to the other device through a frictional force that is generated by the contact between the outer surface of the belt 130 and the other device.

For example, when the outer surface of the belt 130 is brought into contact with one surface of the block chain 20 that moves the slat plates 30 of the carousel 1, a frictional force may be generated between the belt 130 and the block chain 20, and the block chain 20 may rotate correspondingly when the belt 130 rotates.

In detail, referring to FIG. 2, the outer surface of the belt 130 may be brought into contact with a portion of the one surface of the block chain 20. Herein, the belt 130 may rotate clockwise, and the block chain 20 may move rightwards correspondingly. In contrast, when the belt 130 may rotate counterclockwise, the block chain 20 may move leftwards correspondingly.

The outer surface of the belt 130 may be formed to effectively transfer such a frictional force. For example, the outer surface of the belt 130 may be formed as a flat surface or a corrugated surface. In general, a frictional force may increase in proportion to a size of area in contact, or a contact area, and the outer surface of the belt 130 may thus be formed differently to have a wide contact area based on a device to be in contact.

Similar to the driving pulley 110, the driven pulley 120 is also connected to the belt 130 by being folded in the inner surface of the belt 130. In addition, the driven pulley 120 is disposed separately from the driving pulley 110 by a certain distance therebetween, which provides a space in which the belt 130 and the block chain 20 are in contact.

That is, the belt 130 and the block chain 20 may be in contact with each other by a distance by which the driving pulley 110 and the driven pulley 120 are separated from each other, and thus a friction area for transferring power may be obtained. Alternatively, dissimilarly to the driving pulley 110, the driven pulley 120 may not receive power through the drive shaft of the motor 100, and may rotate freely, or perform a free rotation, based on a rotation of the belt 130. That is, the driven pulley 120 may rotate by power transferred from the driving pulley 110 to the belt 130.

In such a case, the driven pulley 120 may rotate in a same direction as the driving pulley 110. For example, referring to FIG. 2, when the driving pulley 110 rotates clockwise, the driven pulley 120 may also rotate in the same direction.

The pressing unit 140 is provided to be in contact with the inner surface of the belt 130. The pressing unit 140 is disposed separately from the driving pulley 110 and the driven pulley 120 to be in contact with the inner surface of the belt 130. For example, as illustrated, the pressing unit 130 is disposed between the driving pulley 110 and the driven pulley 120 while being in contact with the inner surface of the belt 130.

In addition, the pressing unit 140 is provided at a position at which the belt 130 is brought into contact with another device to facilitate the generation of a frictional force between the belt 130 and the other device. For example, the pressing unit 140 may be provided on a side opposite to a position at which the belt 130 is brought into contact with the block chain 20, and be in contact with the inner surface of the belt 130, to press the belt 130 towards the block chain 20.

In such an example, the belt 130 may be disposed between the pressing unit 140 and the block chain 20, and the belt 130 and the block chain 20 may thus be closely connected to each other by the pressing unit 140. Thus, it is possible to effectively transfer, to the block chain 20, a frictional force that is generated by a rotation of the belt 130.

In addition, the elastic unit 150 is provided to press the pressing unit 140 towards the belt 130 and to maintain a tension of the belt 130 and the close connection between the belt 130 and the block chain 20. Thus, it is possible to consistently maintain the frictional force that is generated between the belt 130 and the block chain 20.

The pressing unit 140 includes a pressing frame 143 of which one side is fixed, a pressing portion 141 being in a direct contact with the inner surface of the belt 130, and a pressing connector 142 configured to connect the pressing portion 141 and the pressing frame 143.

The pressing frame 143 has the one side that is fixed and is connected to the pressing connector 142, and may thus support the pressing portion 141.

The pressing portion 141 is directly connected to the inner surface of the belt 130, and may maintain a tension of the belt 130 and press the belt 130 towards the block chain 20, and thus may facilitate the close connection between the belt 130 and the block chain 20.

The pressing portion 141 may be provided in various forms, and provided as, for example, a pressing roller that may rotate along the inner surface of the belt 130.

The pressing roller may rotate freely on a roller shaft and rotate in a direction corresponding to a rotation direction of the belt 130.

In addition, when the pressing roller is in a line contact with the belt 130, a frictional force that may be generated by such a contact between the pressing roller and the belt 130 may be minimized, and thus the belt 130 may readily rotate.

Herein, the belt groove 130a is formed on the inner surface of the belt 130 in a longitudinal direction thereof, and the roller groove 141a corresponding to the belt groove 130a is formed on an outer surface of the pressing roller. For example, as illustrated in FIG. 5, each of the roller groove 141a and the belt groove 130a may include a plurality of V-shaped grooves that is engaged with corresponding ones of the roller groove 141a and the belt groove 130a.

It is also possible to form a pulley groove on each of outer surfaces of the driving pulley 110 and the driven pulley 120 to correspond to the belt groove 130a.

In such a case, the roller groove 141a and the belt groove 130a may be formed to correspond to each other to be engaged with each other, and such an engagement may prevent the belt 130 from being separated from the pressing roller as the belt 130 rotates.

The pressing roller may be provided as a plurality of pressing rollers, and thus may press the belt 130 more effectively. For example, the plurality of pressing rollers may be disposed along the longitudinal direction of the belt 130, and press the belt 130 towards the block chain 20 at a point at which each of the pressing rollers is brought into contact with the belt 130. Thus, the pressing rollers may more effectively press the belt 130 towards the block chain 20.

The pressing connector 142 connects the pressing portion 141 and the pressing frame 143.

In detail, the pressing connector 142 connects rotation shafts of the pressing rollers to allow the pressing rollers to rotate freely, and one side thereof is connected to the pressing frame 143 to support the pressing rollers.

For example, the pressing connector 142 may be provided in a squared C shape, and both protruding ends thereof may connect the rotation shafts of the pressing rollers.

In addition, one side of the pressing connector 142 is connected to the pressing frame 143 to adjust a relative distance between the pressing portion 141 and the belt 130. For example, a hole may be formed in each of the pressing connector 142 and the pressing frame 143, and the respective holes may be connected through a bolt passing through the holes to adjust the distance between the pressing connector 142 and the pressing frame 143.

In addition, the elastic unit 150 is disposed between the pressing frame 143 and the pressing connector 142. The elastic unit 150 may press the pressing connector 142 to be separated further from the pressing frame 143 to adjust the distance between the pressing connector 142 and the belt 130.

When the pressing connector 142 is pressed towards the belt 130 by the elastic unit 150, the pressing roller connected to the pressing connector 142 may be closely connected to the belt 130. That is, such an operation of the elastic unit 150 may allow the pressing roller to be pressed towards the belt 130.

When the elastic unit 150 presses the pressing roller towards the belt 130, a constant level of tension of the belt 130 may be maintained although the belt 130 is worn down while the frictional drive apparatus 10 is being used.

In addition, the elastic unit 150 presses the belt 130 through the pressing roller such that the belt 130 is closely connected to the block chain 20, and thus a frictional force that is generated between the belt 130 and the block chain 20 may be maintained at a constant level. Thus, the frictional force may prevent a slippage between the belt 130 and the block chain 20 even when the belt 130 is worn down, and it is thus possible to effectively transfer power of the frictional drive apparatus 10 to the carousel 1.

The elastic unit 150 may be made with various materials having elasticity. The elastic unit 150 may be a spring, for example.

The elastic unit 150 may be provided as a plurality of elastic units to effectively press the pressing unit 140 towards the belt 130. For example, the elastic unit 150 may be provided at each connection portion at which the pressing connector 142 and the pressing frame 143 are connected, and also provided at a portion that is not a connection portion in order to more effectively perform the pressing. In addition, the elastic units may be disposed along the longitudinal direction of the belt 130, and successively disposed between the pressing connector 142 and the pressing frame 143.

Hereinafter, the carousel 1 including the frictional drive apparatus 10 will be described in detail with reference to FIGS. 7 through 9.

Figure 7:
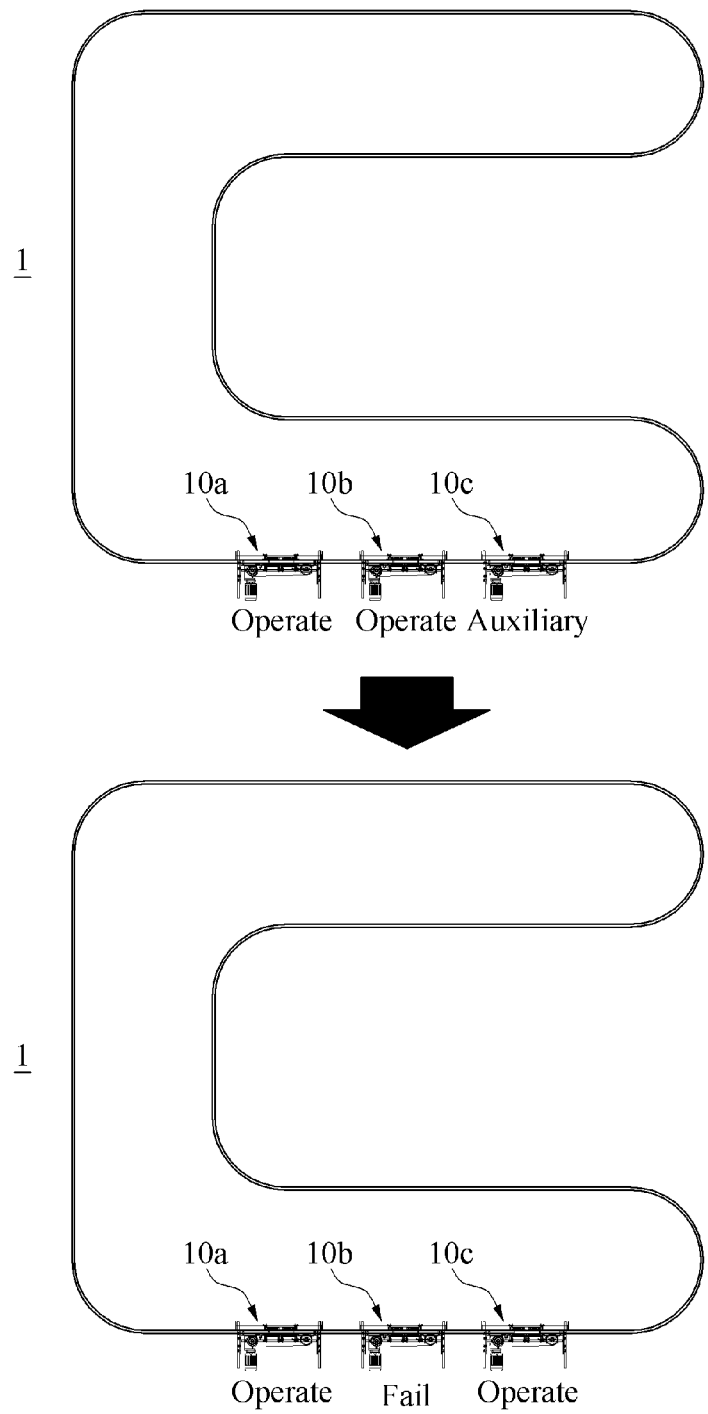
FIG. 7 is a diagram illustrating an example of a relationship of operations of drive apparatuses of a carousel according to an example embodiment.

FIG. 7 is a diagram illustrating an example of a relationship of operations of a plurality of frictional drive apparatuses included in the carousel 1. FIG. 8 is a diagram illustrating an example of how a controller 40 of the carousel 1 controls a frictional drive apparatus. FIG. 9 is a flowchart illustrating a method of controlling a plurality of frictional drive apparatuses by the controller 40 of the carousel 1.

The carousel 1 may include a plurality of frictional drive apparatuses 10 each being the frictional drive apparatus 10 described above. The carousel 1 includes a block chain 20 that moves by being connected to the frictional drive apparatuses 10, and a plurality of slat plates 30 that is connected to an upper portion of the block chain 20 and moves in accordance with a movement of the block chain 20.

The block chain 20 may move when one surface thereof is brought into contact with the belt 130 of the frictional drive apparatus 10 to receive power therefrom. The block chain 20 may include another surface on which a plurality of rollers is provided.

In such a case, the one surface of the block chain 20 is in contact with the belt 130 and the other surface thereof is supported by the rollers, the block chain 20 may effectively receive power without being pushed although the pressing unit 140 presses the belt 130 towards the block chain 20. In addition, the block chain 20 may readily move by being supported by the rollers.

The carousel 1 may include the plurality of frictional drive apparatuses 10, and the frictional drive apparatus 10 may transfer power through friction. Thus, it may not require an additional fastening process for the two.

For example, for a large-sized carousel 1, a plurality of frictional drive apparatuses 10 may be required to normally operate such a large carousel 1. In such an example, the carousel 1 may also include an auxiliary frictional drive apparatus 10 in case one or more frictional drive apparatuses 10 fail, in addition to a plurality of frictional drive apparatuses 10 providing power.

The reverse rotation preventer 160 may be provided in the driving pulley 110 of the frictional drive apparatus 10. The reverse rotation preventer 160 may prevent the driving pulley 110 from rotating in a reverse direction and allow the driving pulley 110 to rotate in a certain direction even when power of the frictional drive apparatus 10 is cut off.

In addition, even when a failure occurs in the frictional drive apparatus 10 and the power is cut off, the driving pulley 110 may perform a no-load rotation in the direction without a rotation of the motor 100, or a reducer or a decelerator, and thus the carousel 1 may not need to be suspended for maintenance of the frictional drive apparatus 10.

Thus, even when some of the frictional drive apparatuses 10 in operation does not normally operate, it is possible to normally operate the carousel 1 by operating or activating another frictional drive apparatus 10 without an additional disassembling and assembling process that may be required to separate the broken or failed frictional drive apparatus 10, otherwise.

That is, by providing power to the auxiliary frictional drive apparatus 10 connected to the carousel 1, the driving pulley 110 that is performing the no-load rotation may rotate to operate the carousel 1, and the carousel 1 may thus operate continuously without being suspended.

For example, as illustrated, when one of frictional drive apparatuses 10a and 10b fails, the carousel 1 may still normally operate by providing power to an auxiliary frictional drive apparatus 10c and the failed frictional drive apparatus, for example, the frictional drive apparatus 10b as illustrated, may be readily separated and repaired.

The controller 40 is provided in the carousel 1, and may control operations of the plurality of frictional drive apparatuses 10. In detail, the controller 40 may control the individual operations of the frictional drive apparatuses 10 by controlling power supply for each of the frictional drive apparatuses 10.

Figure 8:
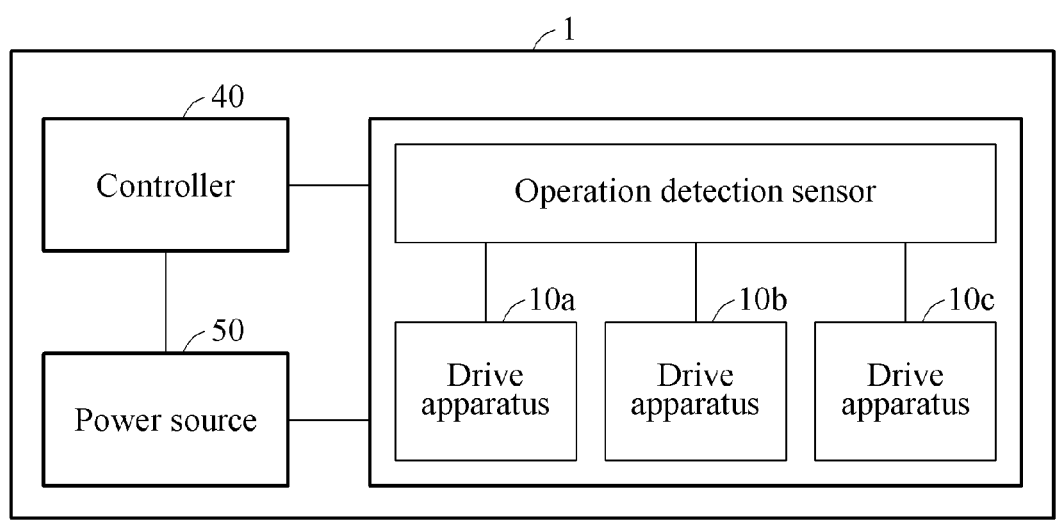
FIG. 8 is a block diagram illustrating an example of how a controller of a carousel controls a plurality of drive apparatuses according to an example embodiment.

For example, as illustrated in FIG. 8, the controller 40 may control some of the frictional drive apparatuses 10 to operate and a remaining as an auxiliary one not to operate.

The controller 40 may be connected to a power source that supplies power to each of the frictional drive apparatuses 10, and may block power to be supplied to some of the frictional drive apparatuses 10.

The carousel 1 may include an operation detection sensor configured to detect whether the frictional drive apparatuses 10 normally operate or not. The controller 40 may receive information as to whether each of the frictional drive apparatuses 10 normally operates and control an operation of each of the frictional drive apparatuses 10.

Figure 9:
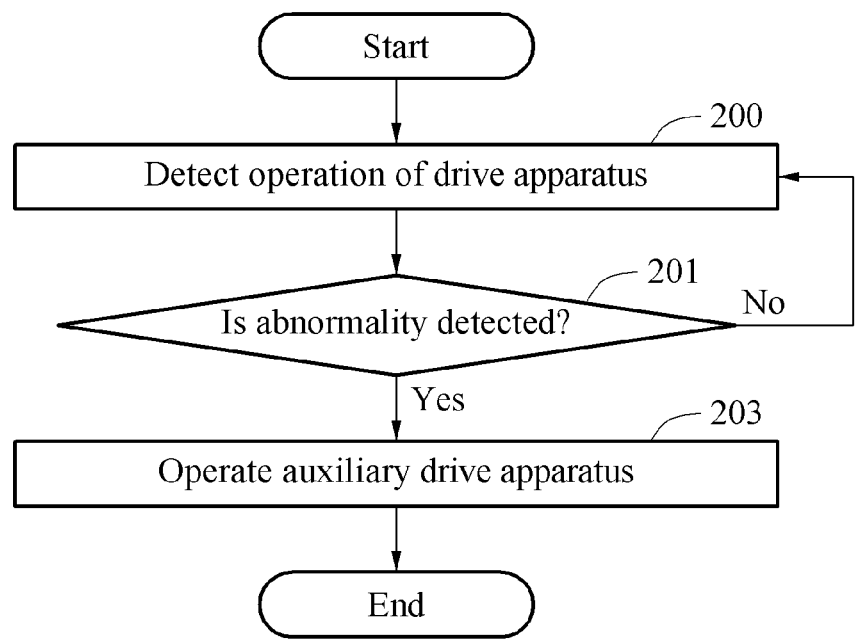
FIG. 9 is a flowchart illustrating a method of controlling a plurality of drive apparatuses by a controller of a carousel according to an example embodiment.

Referring to FIG. 9, the controller 40 detects an operation of the frictional drive apparatus 10 through the operation detection sensor. In this case, when some of the frictional drive apparatuses 10 in operation fails, the controller 40 may immediately cut off power to be supplied to the frictional drive apparatuses 10 that are not normally operating, and supply power to a frictional drive apparatus 10 that is provided as an auxiliary one.

The controller 40 controls the operations of the frictional drive apparatuses 10, and may thus allow the carousel 1 to normally operate even when some of the frictional drive apparatuses 10 fails or do not normally operate.

As described above, power may be transferred through friction that may be generated by a contact between the belt 130 and the block chain 20, and thus it is possible to reduce noise that may be generated by an operation of the carousel 1 including including the frictional drive apparatus 10. In addition, it is not complicated to connect the carousel 1 and the frictional drive apparatus 10.

In addition, by the elastic unit 150 pressing the pressing unit 140 towards the belt 130, it is possible to maintain a constant level of frictional force between the belt 130 and the block chain 20 without an additional replacement process or adjustment of a tension of the belt 130 even when the belt 130 is worn down.

Further, by the reverse rotation preventer 160, it is possible to prevent a reverse rotation of the driving pulley 110 even when power is not provided to the frictional driving apparatus 10, and it is also possible to continuously operate the carousel 1 without a suspension of its operation by the controller 40 controlling power supply for the frictional drive apparatus 10.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A frictional drive apparatus comprising:
a motor;
a driving pulley configured to rotate by the motor;
a belt connected to the driving pulley;
a driven pulley configured to rotate by an operation of the belt;
a pressing unit in contact with an inner surface of the belt;
an elastic unit configured to press the pressing unit towards the belt, and
a reverse rotation preventer provided on a drive shaft of the driving pulley and configured to prevent a reverse rotation of the driving pulley.

2. The frictional drive apparatus of claim 1, wherein:
at least a portion of an outer surface of the belt is brought into contact with a block chain configured to move slat plates of a carousel, and
the elastic unit is configured to press the pressing unit towards the block chain to closely connect the belt and the block chain.

3. The frictional drive apparatus of claim 1, wherein the pressing unit comprises:
a pressing frame;
a pressing portion in contact with the inner surface of the belt; and
a pressing connector of which one side is connected to the pressing portion, and another side is connected to the pressing frame to adjust a relative distance from the belt.

4. The frictional drive apparatus of claim 3, wherein the elastic unit of which one side is connected to the pressing frame and another side is connected to the pressing connector is configured to adjust a distance between the pressing frame and the pressing connector and press the pressing connector towards the belt.

5. The frictional drive apparatus of claim 3, wherein:
the pressing portion comprises a plurality of rotatable pressing rollers, and
the pressing rollers are disposed along a longitudinal direction of the belt.

6. The frictional drive apparatus of claim 5, wherein:
the belt comprises a belt groove formed on the inner surface of the belt in the longitudinal direction of the belt,
each of the pressing rollers comprises a roller groove corresponding to the belt groove, and
the belt groove and the roller groove are brought into contact with each other to be engaged with each other.

7. A carousel comprising:
a plurality of drive apparatuses;
a block chain connected to the drive apparatuses and to move; and
a plurality of slat plates successively disposed to move in accordance with the movement of the block chain,
wherein each of the drive apparatuses comprises:
a driving pulley configured to rotate by receiving power from a motor;
a belt connected to the driving pulley;
a driven pulley configured to rotate in accordance with a movement of the belt;
a pressing unit in contact with an inner surface of the belt;
an elastic unit configured to press the pressing unit towards the belt; and
a reverse rotation preventer provided on a drive shaft of the driving pulley and configured to prevent a reverse rotation of the driving pulley.

8. The carousel of claim 7, further comprising:
a controller configured to control operations of the drive apparatuses, wherein the controller is configured to control a portion of the drive apparatuses to operate.

9. The carousel of claim 8, wherein, when operations of the portion of the drive apparatuses in operation are suspended, the controller is configured to control another portion of the drive apparatuses not in operation to operate.

* * * * *